United States Patent [19]

Smith

[11] Patent Number: 4,579,564

[45] Date of Patent: Apr. 1, 1986

[54] POLISHING PAD FOR A FINE FINISH

[76] Inventor: Robert S. Smith, 1263 Emory St., San Jose, Calif. 95126

[21] Appl. No.: 692,506

[22] Filed: Jan. 18, 1985

[51] Int. Cl.⁴ .............................................. B24D 17/00
[52] U.S. Cl. ...................................... 51/293; 51/308; 556/425
[58] Field of Search .................. 556/425; 51/293, 308

[56] References Cited

U.S. PATENT DOCUMENTS 3,992,429  11/1976  Knollmueller ...................... 556/458
4,035,411  7/1977  Heckert et al. ...................... 556/425
4,440,745  4/1984  Schmidt et al. ...................... 51/308
4,503,242  3/1985  Plueddemann ...................... 556/425

Primary Examiner—Paul Lieberman
Assistant Examiner—Willie J. Thompson
Attorney, Agent, or Firm—Robert Samuel Smith

[57] ABSTRACT

A medium for polishing surfaces comprised of very fine silica particles bonded into a resinous foam. The medium is compounded by bubbling ammonia through a mix of polyol and ethyl silicate to generate bonded silica particles of very small size, then adding a di-isocyanate compound to develop the foam.

8 Claims, 3 Drawing Figures

STEP ONE ------ MIXING ETHYL SILICATE AND POLYOL

STEP TWO ------ BUBBLE AMMONIA THROUGH THE MIX

STEP THREE ----- APPLY HEAT, VACUUM

STEP FOUR ------ ADD POLYOL

STEP FIVE ------ ADD BLOWING AGENT

STEP SIX ------- ADD DI-ISOCYANATE

STEP SEVEN ----- PLACE IN A CLOSED VENTED CONTAINER

STEP EIGHT ----- MACHINE THE LOAF TO DESIRED SHAPE

FIG. 1
STEP ONE ------ MIXING ETHYL SILICATE AND POLYOL
STEP TWO ------ BUBBLE AMMONIA THROUGH THE MIX
STEP THREE ------ APPLY HEAT, VACUUM
STEP FOUR ------ ADD POLYOL
STEP FIVE ------ ADD BLOWING AGENT
STEP SIX ------ ADD DI-ISOCYANATE
STEP SEVEN ------ PLACE IN A CLOSED VENTED CONTAINER
STEP EIGHT ------ MACHINE THE LOAF TO DESIRED SHAPE
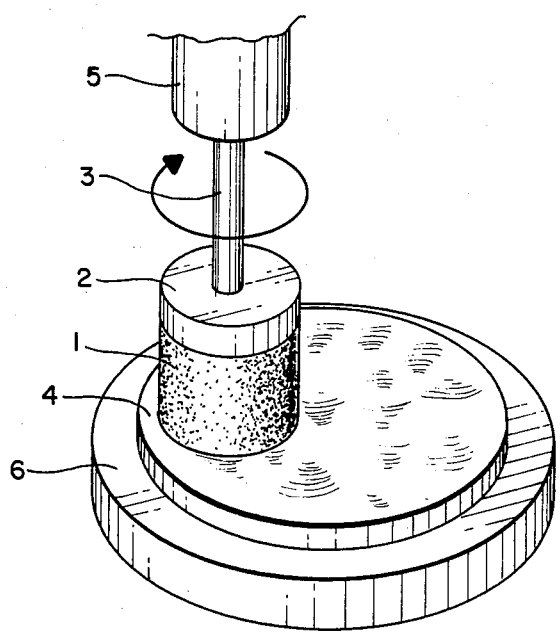
FIG. 2
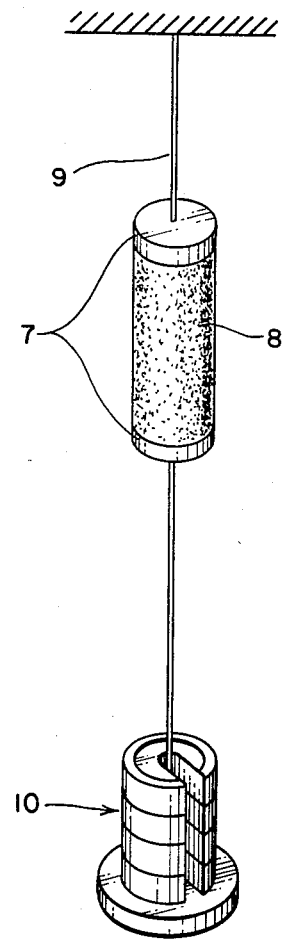
FIG. 3

POLISHING PAD FOR A FINE FINISH

BACKGROUND OF THE INVENTION

1. Field of the Invention

This invention has to do with the formulation of compounds to be used in the polishing of surfaces such as aluminum surfaces used for magnetic recording.

2. Prior Art

Principles in the art of polishing are well understood and have been practiced for many years. A polishing medium is formulated which consists of hard abrasive particles. The particles should be harder than the surface to be polished. The particles are supported in a supporting medium which is softer than the medium to be polished. The polishing medium is rubbed across the surface to be polished while simultaneously a liquid is applied which lubricates the surface to prevent ingredients of the polishing medium from sticking to the surface and to wash away wear debris.

Many kinds of abrasive particles have been used in this application—alumina, silicon carbide, silica, ceria, diamond,—to name a few.

Many kinds of supporting media have been used—cloth, tar, tin, glues, resins, including foams.

Many kinds of liquids have been used as lubricants,—kerosene, water soluble oils, etc.

Many tecniques are used for charging the abrasive into the supporting medium. For example, for polishing ceramics, diamond powder is the abrasive of choice; tin is the supporting medium. Tin is electroplated onto a steel backup plate and the diamond is rubbed into the tin plate so that only a part of the diamond protrudes to polish the ceramic surface.

Another technique, used for the polishing of semiconductor wafers, is to supply the abrasive as a liquid slurry. Aquaeous based liquids are available commercially which cantain colloidal sized silica particle (10–50 Angstroms in size). These liquids are available from the Dupont corporation, Dover, Del. under the trade name, Ludox. The liquid is applied to polishing pads, such as felt and rubbed onto the surface to be polished. Normally, silica particles in this size range are unstable and coalesce to form larger particles. In order to stabilize the particles against growth, polishing solutions such as Ludox contain a base—e.g. sodium, ammonia, etc. Thus, the polishing action is the result of very fine particle size and the reactivity of the solution.

The chemical reactivity of the solution can be a problem with some materials. Furthermore, the requirement to add solution continuously introduces an additional parameter into the control of the polishing and is expensive.

It is an objective of this invention to provide a polishing medium in which the abrasive particle sizes are of colloidal dimensions, do not react with the surface being polished, and are applied uniformly in a manner which does not require careful control as with the liquid containing abrasive.

Another technique is to incorporate the abrasive into the support matrix. This has been done using glues and various other resins as the supporting matrix. The problem with this technique is to obtain a very uniform dispersion of the particles and preventing the particles from clumping. Powders of fine particle size are expensive because of the necessity to grade them. For this reason it is not practical to use powders in the above manner where the particle sizes are less than about five microinches. Furthermore, there is no chemical bonding of the particles to the matrix. Consequently, the polishing medium is weakened by incorporation of the powders so that the polishing medium tends to wear. This mitigates against providing a flat polished surface particularly at the edges.

It is a further objective of this invention to provide a polishing medium which contains very fine abrasive particles, below a microinch in size and preferably in the size range from 10 to 50 nanometers which are very evenly distributed throughout the support matrix, are chemically bonded to the support matrix to provide strength and do not contain large particles or agglomeration of particles that would otherwise scratch or roughen the surface to be polished.

These and other advantages of this invention will be apparent to one skilled in the art of polishing after further examination of the drawings and description.

SUMMARY OF THE INVENTION

The polishing medium of this invention is a foam matrix with particle size that is uniform and be in a range down to 10 Angstroms. The structure is further characterized by the absence of clumps of particles that would otherwise mar the surface. The medium may be formulated by mixing a liquid, ethylsilicate, with a polyol, initiating growth of the silica particles, removing the by products of the reaction, then polymerizing with a polymerizing agent such as a di-isocyanate to form the rigid polishing medium.

BRIEF DESCRIPTION OF THE DRAWINGS

In FIG. 1 is shown the flow diagram of the steps taken to formulate the polishing compound of this invention.

In FIG. 2 is shown a polishing pad polishing a disk.

FIG. 3 shows the method of measuring the tensile strength of the polishing medium.

DESCRIPTION OF THE INVENTION

Turning now to a more detailed description, there is shown in FIG. 1 a flow diagram of a process for making the polishing compound of this invention. For purposes of illustration, a polyol-di-isocyanate system is discussed although other resin systems are possible and are an embodiment of this invention.

In FIG. 1, step 1, is shown to be the blending of liquid ethyl silicate monomer with polyol monomer, a viscous syrupy liquid. Ethyl silicate is a monomer whose structure is represented by

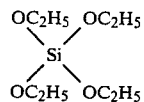

Polyol resin is a monomer whose structure is represented by

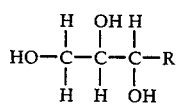

R represents alkyl and aryl groups capable of polymerizing with similar groups.

The polyol molecule is seen to be a hydrocarbon to which a number of hydroxyl radicals, OH, are attached.

Referring again to FIG. 1, in the second step, ammonia is shown to be bubbled through the mix. This activates the polyol, probably by the reaction

so that combination with the polyol can ocurr by the formation of siloxane bonds.

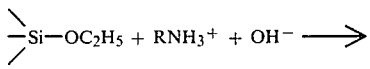

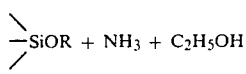

The generation of alcohol, $C_2H_5OH$, in the presence of ammonia, leads to silanol bonds, probably by the route

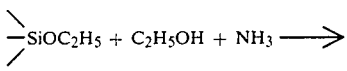

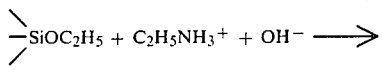

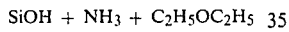

The silanol molecules can then condense to form siloxane bonds

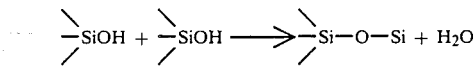

There are two observations that suggest these reactions. First, a marked increased in the viscosity suggests an increase in the molecular weight of the polyol. Second, there is no reaction if the ammonia is bubbled through pure ethyl silicate monomer.

The result is the formation of a polyol in which some of the hydroxyl radicals, OH, have been replaced by bonds to silica particles.

Since the silica particles are grown in the polyol syrup, there is no opportunity for clumps to be present as would be the case if the silica were formed separately and added to the polyol after the formation of the particle.

Furthermore, the particles are very uniformly distributed throughout the polyol and chemically bonded to the molecules of the resin.

Referring again to figure one, the third step is to remove by products of the reaction—water, ethyl ether, ($G_2H_5OC_2H_3$), and ammonia, that will remain in the mix. This can be accomplished by warming in a vacuum at a temperature above 100° C. to drive off all three products. This is feasible since the polyol boils at a temperature above 300° C. An alternate method would be to mix in salt to absorb the water, filtering out the salt, then warming to over 50° C. to drive off the ether and ammonia.

The particle size of the silica at this point and the distribution of the silica in the polyol depends on the original ratio of ethyl silicate/polyol in the mix. This is because of the competition between polyol to silica bonding and silica to silica bonding. As pointed out above, particle size will be in the range of ten to one hundred Angstroms. If it is desired to have larger particles of silica, then alcohol may be included in the original mix of polyol and ethyl silicate. The inclusion of alcohol is indicated in FIG. 1 step 1.

Up to this point, the ratio of polyol, ethyl silicate and alcohol was selected on the basis of the desired particle size and amount of bonding in the end product. In the fourth step, an additional amount of polyol is added which will not react further with the ethyl silicate has all reacted. The purpose of this addition is to establish the percentage of silica in the final compound.

In the fifth step, an ingredient called a "blowing agent" is mixed in to the resin. The blowing agent may be freon, water or alcohol but is preferably freon. The inclusion of a blowing agent results in the formation of the foam structure as will be discussed in the next step.

In the sixth step, a liquid di-isocyanate is stirred into the mix (preferrably toluene di-isocyanate.). An immediate reaction will begin between the remaining hydroxyl radicals of the polyol and the di-isocyanate

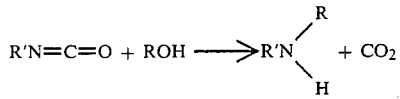

In addition, if freon is present as a blowing agent, the heat of reaction of polyol and di-isocyanate will cause the freon to vaporize. (Its boiling point is 55° C.) This causes bubbles to form in the gelatinous mix so that as the mix becomes rigid, a foam structure is formed.

If the heat of reaction is insufficient to cause sufficient expansion of the foam, then the di-isocyanate may be preheated to a temperature preferably below 100 C. before stirring into the mix.

If water or alcohol has been used as the blowing agent, then the foam forming action occurs because of the evolution of $CO_2$ generated by the following reaction.

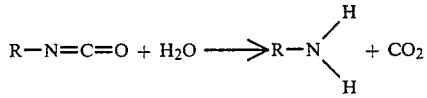

and a similar reaction when alcohol is used as the blowing agent.

In the seventh step as the foam is forming, the mix is placed in a closed container with a small vent so that the expanding foam completely fills the container. The volume of the container determines the density of the foam. Finally, the molecular formula of the foam is

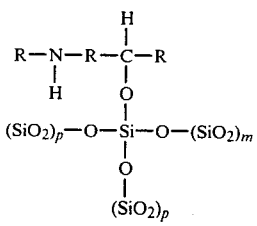

where R may be an alkyl or aryl group capable of polymerization with similar groups and n, m, and p are integers. The foam becomes rigid and may be removed from the container. In the eighth step, the loaf is formed (machined) into the shape determined by its ultimate usage. For example, referring to FIG. 2, it may be sliced, 1, glued to a plate, 2, and attached to a shaft, 3, and used to polish a rotating metal plate, 4.

A further illustration of the practice of this invention is presented in the following example, To 130 grams of polyol was stirred in 73 grams of liquid ethyl silicate and 5 grams of ethyl alcohol. Ammonia was bubbled through the mix for three minutes, then the container was capped and the contents allowed to stand for 90 minutes. Then the mix was stirred and heated to 100° C. for an hour in order to drive off any unreacted water, ether and alcohol. After allowing the mix to cool to room temperature, it was added slowly to 5 grams of freon. Seventy (70) grams of toluene di-isocyanate was heated to 70° C. then quickly stirred into the mix. The mix soon began to expand and was placed into a vented container and capped. The contents were allowed to stand overnight. The following day the rigid foam loaf was removed from the container and cut into slices, two inches diameter and ½ inch thick, and glued to a plate attached to a shaft as in the manner shown in FIG. 2.

Now a second foam loaf was made identical to the first one except that there was no inclusion of ethyl silicate or alcohol and no ammonia was used.

In order to compare the polishing capability of the pads with and without ethyl silicate, two aluminum surfaces were prepared with surface roughnesses of one microinch arithmetic average. One surface was polished with the polishing pad of example One whereas the second was polished with the pad of example two. Polishing was performed by rotating the pad as shown in figure two where the pad, 1, seen glued to plate 2 attached to shaft 3, is rotated in a drill press chuck, 5. The aluminium plate being polished was supported on a turntable, 6 below the rotating pad. Each aluminum surface was polished for 60 seconds using kerosene for a lubricant. After polishing, the finish on each surface was measured using a profilometer. The finish on the surface polished with the pad of example one was found to have been reduced to 0.2 microinches whereas the surface polished with the pad of example two was unchanged at one microinch (arithmetic average.).

In order to further examine the structural characteristics of the polishing compound, a bar was made from the loaf of example one and two. The bars were one inch in diameter and three inches long. (See figure three.) Plates, 7, were glued on the ends of the bars, 8. The plates had wires attached to their centers, 9, so that the bars could be suspended from one end and weights 10, from the other. In this manner it was demonstrated that the pad of example one had a markedly greater tensile strength than the bar of example two. This observation can be explained on the basis that the silica particles of example one were chemically bonde to the polymer matrix.

In the foregoing discussion, the invention was illustrated using the polyol-di-isocyanate system. It will be obvious to those skilled in the art that many polymeric systems could be used to provide the rigid foam structure for the support of the submicron particles.

The foam structure greatly enhances the polishing action since the pores carry the lubricant to the area being polished, provide an escape for wear debris which would otherwise interfere with the action of the polishing medium and provide a compliant support for the abrasive particles thereby minimizing the incidence of discrete scratches and providing a finer finish that is more uniform.

Using the techniques of this invention to provide a polishing medium where the abrasive particles are evenly distributed and uniform in size and controllable in size down to 10 Angstroms, one is thereby enabled to obtain finishes that are much finer than can be obtained using techniques of the prior art.

I claim:

1. A rigid compound whose molecules have the formula

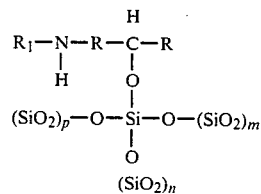

where each R represents a group selected from an alkyl and aryl group capable of further polymerization with similar groups and m, n, and p are integers greater than one.

2. A rigid compound as in claim one wherein the structure of said compounds contains a plurality of pores.

3. A rigid compound as in claim two wherein that portion of the molecule containing silicon and oxygen atoms has dimensions less than one micron and greater than ten Angstroms.

4. A method for polishing a surface which comprises the the step of rubbing the surface with a rigid compound containing pores wherein said compound has the formula

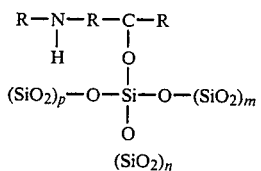

where each R represents a group selected from an alkyl group and an aryl group capable of polymerization with similar groups and m,n and p are integers greater than one and wherein the dimensions of the group containing Silicon and Oxygen atoms are larger than 10 Angstroms and smaller than one micron.

5. A method for formulating a rigid compound for polishing surfaces which comprises:
   (a) stirring ethyl silicate into a polyol to form a mix;

(b) bubbling ammonia through the mix so that particles of silica are formed which are larger than ten Angstroms and smaller than one micron, and which are chemically bound to the resin polyol molecule;

(c) stirring in a di-isocyanate compound so that a polymer is formed by reaction of the di-isocyanate with the hydroxyl groups of the polyol;

(d) allowing the mix to harden;

so that a rigid structure is formed which may be shaped to a form suitable for polishing surfaces.

6. A method for formulating a rigid compound as in claim 5 which further comprises;

stirring in liquid alcohol after step (a) so that larger groups of silica are formed than would be formed if the alcohol were not present.

7. A method for formulating a rigid compound as in claim 6 which further comprises:

heating the mix to a temperature gerater than 100 C. after step (b) so that by products which include water, alcohol, ether and ammonia are driven out of the mix so that the reactivity of the di-isocyanate will not be reduced.

8. A method for formulating a rigid compound as in claim 5 which further comprises stirring in liquid freon after step (b) so that the freon vaporizes during step (c) thereby causing bubbles of vapor to form while the mix is polymerizing and thereby providing a porous rigid structure.

* * * * *